(12) United States Patent
Gasser et al.

(10) Patent No.: US 6,192,786 B1
(45) Date of Patent: Feb. 27, 2001

(54) ESPRESSO BREWING HEAD UNIT

(75) Inventors: Ruedy Gasser, Buerglen; Jürg Strub, Oberaegeri, both of (CH)

(73) Assignee: MAXS AG, Sachseln (CH)

( * ) Notice: Subject to any disclaimer, the term of this patent is extended or adjusted under 35 U.S.C. 154(b) by 0 days.

(21) Appl. No.: 09/316,110

(22) Filed: May 20, 1999

(30) Foreign Application Priority Data

Jul. 16, 1998 (DE) ............................................. 198 32 063

(51) Int. Cl.[7] ................................................. A47J 31/06
(52) U.S. Cl. ................................................. 99/319; 99/323
(58) Field of Search ........................... 99/323, 318, 295, 99/302 R, 293, 289 R, 319

(56) References Cited

U.S. PATENT DOCUMENTS 4,497,243 * 2/1985 Cavalli ..................... 99/323
5,870,943 * 2/1999 Levi et al. ................ 99/302 R X

FOREIGN PATENT DOCUMENTS

97/26816 * 7/1997 (WO) ....................... 99/318

* cited by examiner

*Primary Examiner*—Reginald L. Alexander
(74) *Attorney, Agent, or Firm*—Finnegan, Henderson, Farabow, Garrett & Dunner, L.L.P.

(57) ABSTRACT

An espresso brewing head unit comprises a potshaped coffee receptacle in which a filter plate with coffee discharge openings is provided. A lateral wall of the coffee receptacle and the filter plate define the filling volume of the coffee receptacle so that portioning is substantially predetermined. For varying the filling volume, the filter plate is additionally arranged such that it is displaceable relative to the lateral wall of the coffee receptacle.

15 Claims, 11 Drawing Sheets

ESPRESSO BREWING HEAD UNIT

BACKGROUND OF THE INVENTION

The present invention refers to an espresso brewing head unit comprising a potshaped coffee receptacle in which a filter plate with coffee discharge openings is provided, a lateral wall of the coffee receptacle and the filter plate defining the filling volume of the coffee receptacle.

Such an espresso brewing head unit is known from DE 197 11 025 C1. This espresso brewing head unit comprises a potshaped coffee receptacle which consists essentially of plastic material, a reinforcing metal ring being formed in the upper rim of said coffee receptacle. Laterally projecting locking flanges are also reinforced with metal and serve as components of a bayonet lock for attaching the unit to an espresso machine. A filter plate is inserted in the coffee receptacle. This can be a simple filter plate which is anchored in the wall of the coffee receptacle or which is inserted in said coffee receptacle in a separate, framelike injection moulded part. It is also possible to arrange below the filter plate a support plate having a central discharge opening. At the bottom of the coffee receptacle there is a closure cap provided with one or with a plurality of coffee discharge openings. The filter plate extends at right angles to the axis of the coffee receptacle which is provided with a laterally arranged handle.

Although this structural design constitutes a very compact espresso brewing head unit that can be produced at a reasonable price, the filling volume located above the filter plate and surrounded by the wall of the coffee receptacle is predetermined so that it is always only a specific amount of espresso which can be produced at a time or that in the case of fractional filling (e.g. half filling) a deterioration in the quality of the espresso made must be reckoned with.

For a good quality of the espresso, it is important that a dense coffee cake through which the hot water must flow is formed in the coffee receptacle.

Hence, it is the object of the present invention to provide a compact espresso brewing head unit which produces good quality independently of the amount of espresso to be made.

SUMMARY OF THE INVENTION

According to the present invention, this object is achieved by the features that, for varying the filling volume, the filter plate is arranged such that it is displaceable relative to the lateral wall of the coffee receptacle. The filling volume can be varied in this way and adapted to the amount of coffee powder to be filled in.

It is true that it has already been known to associate with an espresso brewing head unit a plurality of different pot-shaped filter inserts which can then be used according to the desired amount of espresso and which have different filling volumes. This, however, means a step backwards, since a plurality of loose individual components exists which must be kept such that they are easily accessible. In the case of the present invention, attention has been paid to the fact that the compactness of the espresso brewing head unit is maintained and that no loose structural components exist.

In addition the present invention offers the possibility of ejecting the coffee powder cake from the coffee receptacle by means of the displaceable filter plate after brewing of an espresso, i.e. the banging out of the espresso brewing head unit, which is known from the past and which is in principle troublesome, can be avoided. Damage which may be caused to the unit is therefore substantially reduced, since such banging out has normally been carried out with substantial force in the prior art.

Normally, it suffices when predetermined filling volumes are predetermined by the displaceability of the filter plate. Hence, one embodiment is provided with the feature that the filter plate is arranged such that it is adapted to be displaced in predetermined steps in the axial direction of the coffee receptacle. This is, for example, a possibility of realizing automatically a filling volume for two cups of espresso, one cup of espresso and the discharge position (fully raised position). Intermediate steps for stronger or less strong espresso can be provided. In addition, one or several position(s) for receiving so-called pillows (coffee bags) can be provided. Embodiments with e.g. 3, 6 or 7 steps are imaginable. The steps may have identical or different sizes.

In accordance with a preferred embodiment, an elevating means is arranged in the coffee receptacle below the filter plate, said elevating means moving the filter plate to the desired position in response to activation of an operating element. It follows that the elevating means is fully integrated in the coffee receptacle and is, essentially, not visible from outside. The espresso brewing head unit has therefore a compact outward appearance. In addition, an elevating means is most suitable because such an elevating means can rest on the comparatively stable bottom of the coffee receptacle.

One possibility of realizing the elevating movement is that, on the bottom side of the filter plate, at least one projection is arranged, that the elevating means comprises at least one movable cam element and that the projection is in contact with said cam element, said, projection sliding along said cam element in response to a movement of said cam element and being adapted to be moved to various elevating positions. The projection need not be attached directly to the filter plate, but it can also be connected thereto via intermediate elements. In addition, it is possible to provide a plurality of such projections so that, e.g. in the case of a filter plate having the shape of a circular disc, an elevating force which is symmetrical with regard to the axis of said filter plate can be applied. By using at least one separate projection on the filter plate and a cam element, different elevating movements can be realized by an arbitrary structural design. Also the selection of material for the surfaces sliding on one another and the surface design of said surfaces can be realized in an advantageous manner so that wear will be reduced to a minimum.

Since the coffee receptacle has normally the form of a hollow cylinder, it is according to a further variant particulary advantageous that the cam element is arranged such that it is adapted to be rotated about the axis of the coffee receptacle and that it has an elevating control contour which is in contact with the projection on the filter plate and which is arranged on an axially parallel cam projection, said elevating control contour extending transversely to the axis. Hence, the cam element controls the elevating movement of the filter plate not only by means of its circumference but also by means of its axial end face and can e.g. have the shape of a drum. In accordance with the number of projections a corresponding number of cam projections can be provided. These cam projections can be distributed around the axis of rotation at uniform angular intervals so that the elevating force can be applied symmetrically. Since a relative rotational movement between the cam element and the filter plate suffices, the cam element is normally rotated about its axis, whereas the filter plate is moved linearly.

In order to achieve a stepwise vertical adjustment of the filter plate by means of such a control contour, the present invention can also be so conceived that the elevating control contour of the at least one cam projection of the cam element is provided with a plurality of flat step areas arranged on different levels, said step areas defining the elevation positions of the filter plate and being interconnected via ramp surfaces. The flat step areas mark the different positions at which the filter plate remains for determining a specific filling volume. When the at least one projection slides along the ramp surfaces due to a rotation of the cam element, the filter plate will be displaced in the axial direction. Due to the use of the step areas and ramp surfaces on the end face of the cam element, the admissible maximum pressure of an espresso machine (up to 15 bar) can be taken up very well, since the elevating control contour can be provided with a very robust structural design.

In order to prevent an influence of the brewing process on the structural design of the elevating mechanism as far as possible, one embodiment is so conceived that the filter plate is arranged on a funnel-shaped filter carrier provided with a central discharge tube which passes through a central opening of the cam element. The funnel-shaped filter carrier will therefore collect all the liquid below the filter plate and discharge said liquid centrally via the discharge tube through the cam element so that the cam element will essentially not come into contact with the hot liquid. This will eliminate contaminations of the mechanism and negative influences to a very large extent.

In addition, the bottom of the coffee receptacle can have arranged thereon a tubular extension projecting into said coffee receptacle, the outer contour of said tubular extension serving as an axle pin for the cam element and the inner contour thereof being used for guiding the discharge tube of the filter carrier such that it is secured against rotation relative to said tubular extension. It follows that the hot coffee liquid is introduced directly from the discharge tube into the tubular extension and discharged therethrough. Since the cam element is rotatably supported on the outer surface of said tubular extension, it is also possible to provide a sealing means at this point, which can protect the outer surface of said tubular extension against liquid. On the basis of this structural design, the filter plate has also been secured against rotation in a very simple manner. According to the maximum displacement path of the filter plate, the tubular extension and the discharge tube can also be implemented such that one can be inserted into the other or they can be implemented as telescopic elements.

A simple possibility of producing the rotational movement of the cam element can be achieved on the basis of the features that a toothed rim is arranged on the cam element, said toothed rim being in engagement with a rack implemented as an operating element, whereby the cam element will be caused to carry out a rotational movement in response to a displacement of said rack. It follows that the toothed rim must be arranged coaxially with the axis of rotation of the cam element, whereas the rack is moved tangentially past the toothed rim. In accordance with the module chosen, a comparatively large rotational movement can be achieved by means of a comparatively small displacement movement of the rack.

A further possibility of increasing the compactness of the whole espresso brewing head unit is to be seen in that a handle is arranged on the coffee receptacle, the operating element being accommodated in said handle, at least in certain areas thereof, and adapted to be moved by means of a manipulation device on said handle. This means that very close to the hand, e.g. at a location which is within easy reach of the thumb, a manipulation device can be arranged, which can be used for displacing e.g. the rack.

In accordance with a preferred embodiment, a slide member can be provided as a manipulation device, said slide member being adapted to be locked at positions associated with the desired filling volumes and displacing the rack transversely to the axis of the toothed rim. When a respective intermediate position for defining a specific filling volume has been reached, the slide member will snap into place so as to indicate to the user that a specific filling volume has been reached. Due to the linear operating movement of the rack, only a linear movement of the manipulation device is required.

DESCRIPTION OF THE DRAWINGS

In the following, an embodiment of the espresso brewing head unit according to the present invention will be explained in detail on the basis of a drawing, in which.

DETAILED DESCRIPTION OF THE INVENTION

Figure 1:
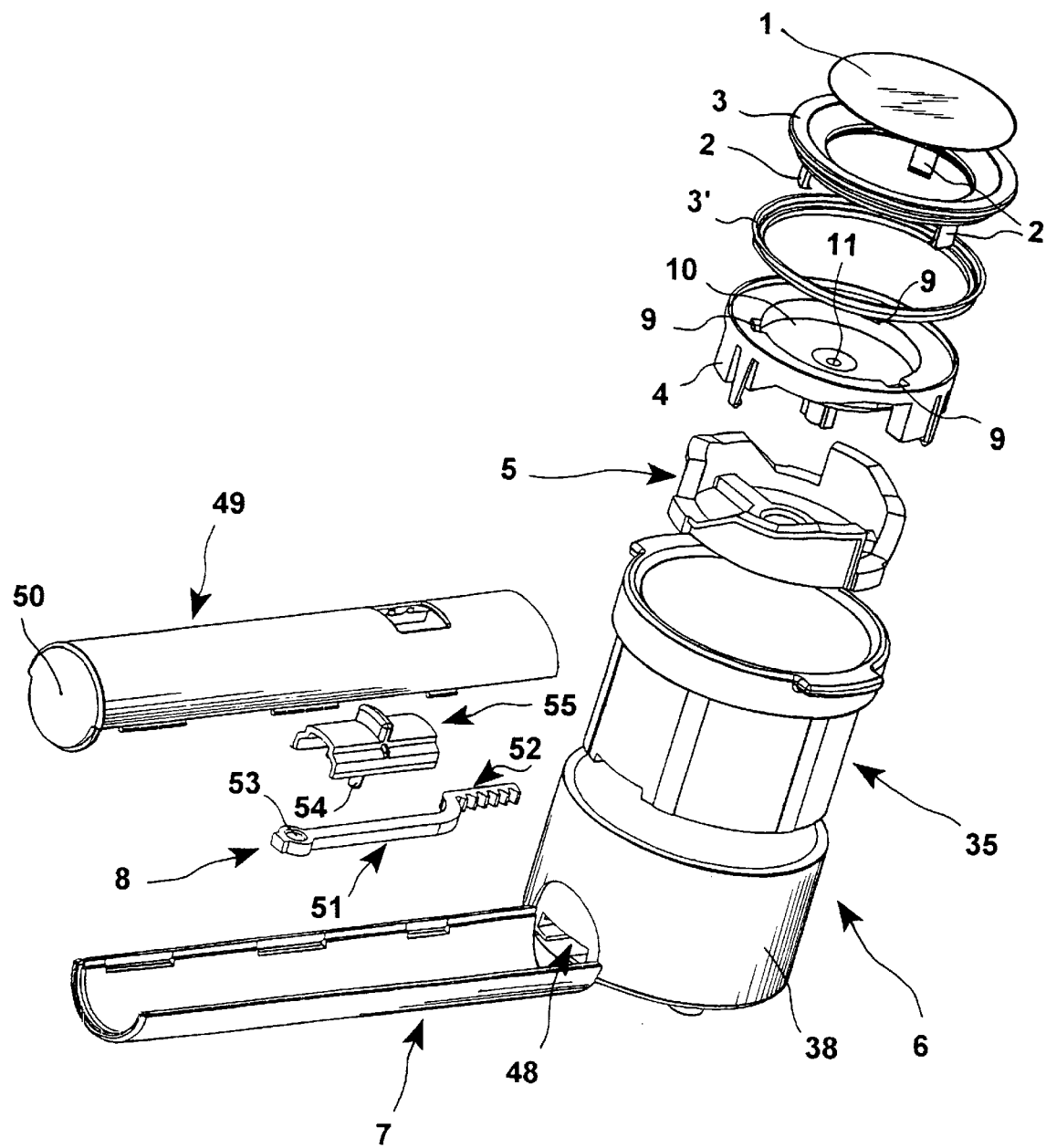
FIG. 1 shows an exploded view of an espresso brewing head unit.
Figure 2:
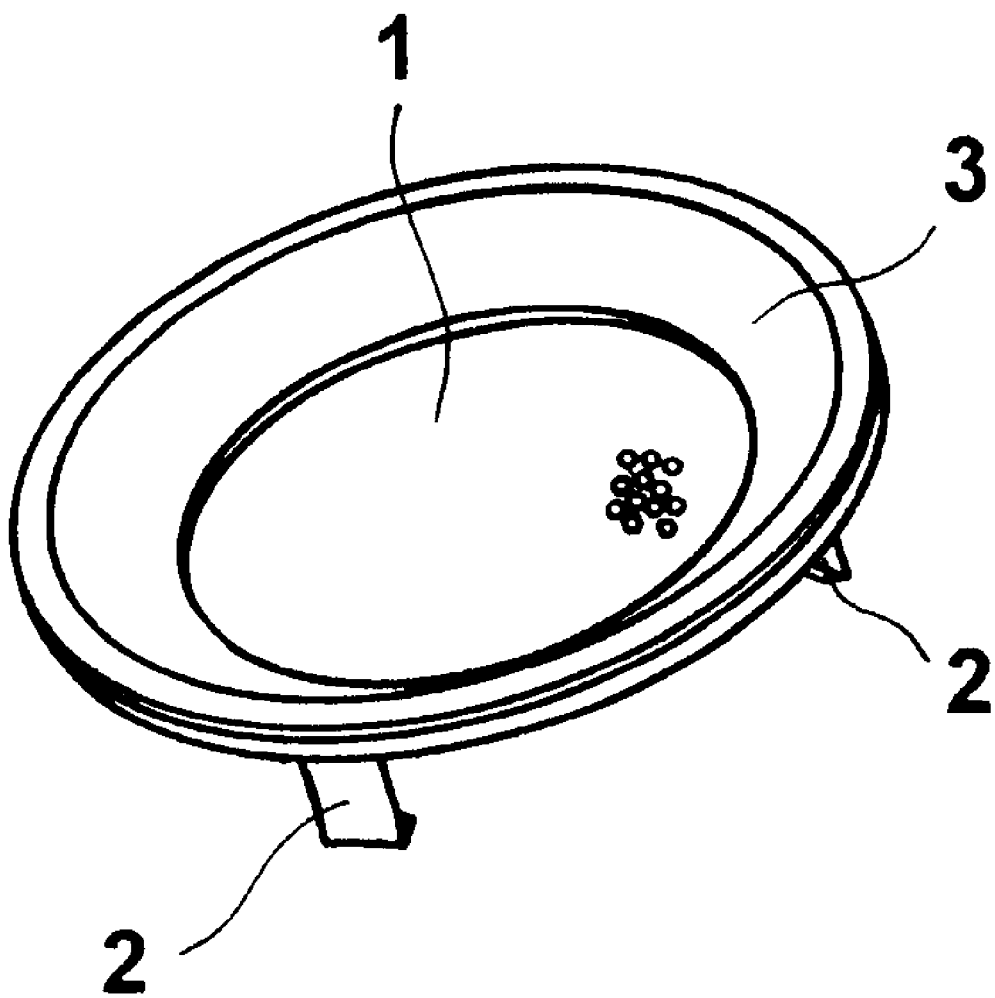
FIG. 2 shows a perspective view of the filter plate with the frame holder from above.
Figure 3:
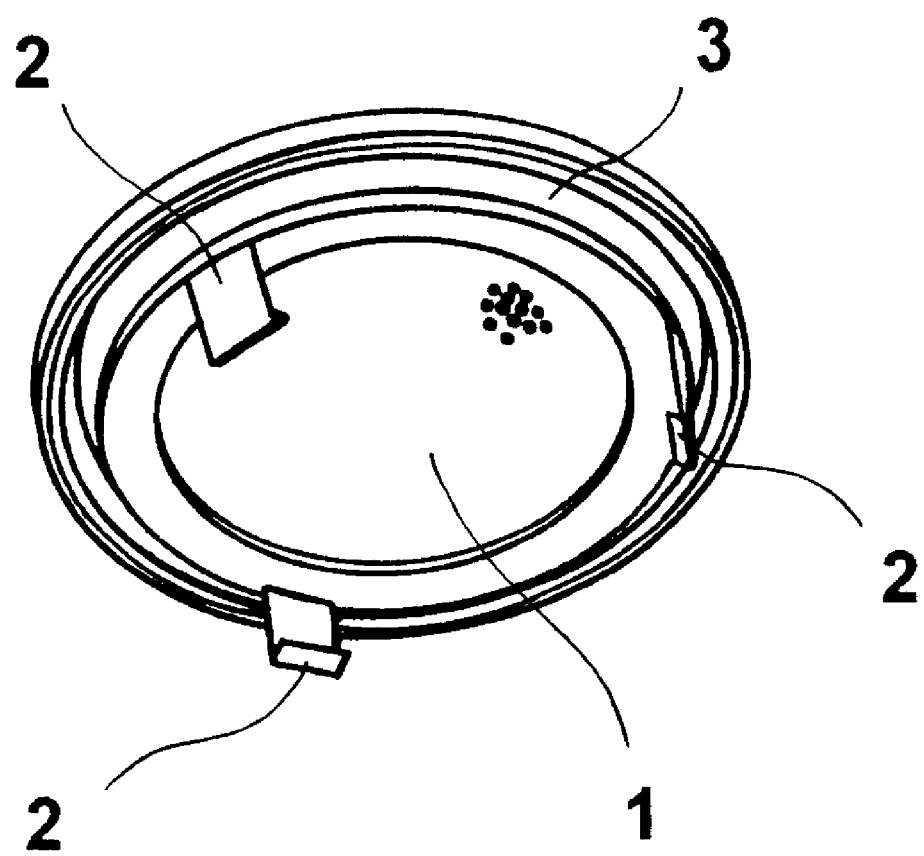
FIG. 3 shows the component according to FIG. 2 in a perspective view from below.

The espresso brewing head unit shown in the drawings essentially comprises a circular filter plate 1, which is produced from a thin metal foil and provided with etched filter openings and which is anchored in an annular frame holder 3 provided with locking legs 2, a funnel-shaped filter carrier 4, a cam element 5 arranged below said filter carrier 4, and a multipart coffee receptacle 6 provided with a handle 7 and an operating mechanism 8 arranged in said handle 7.

Figure 4:
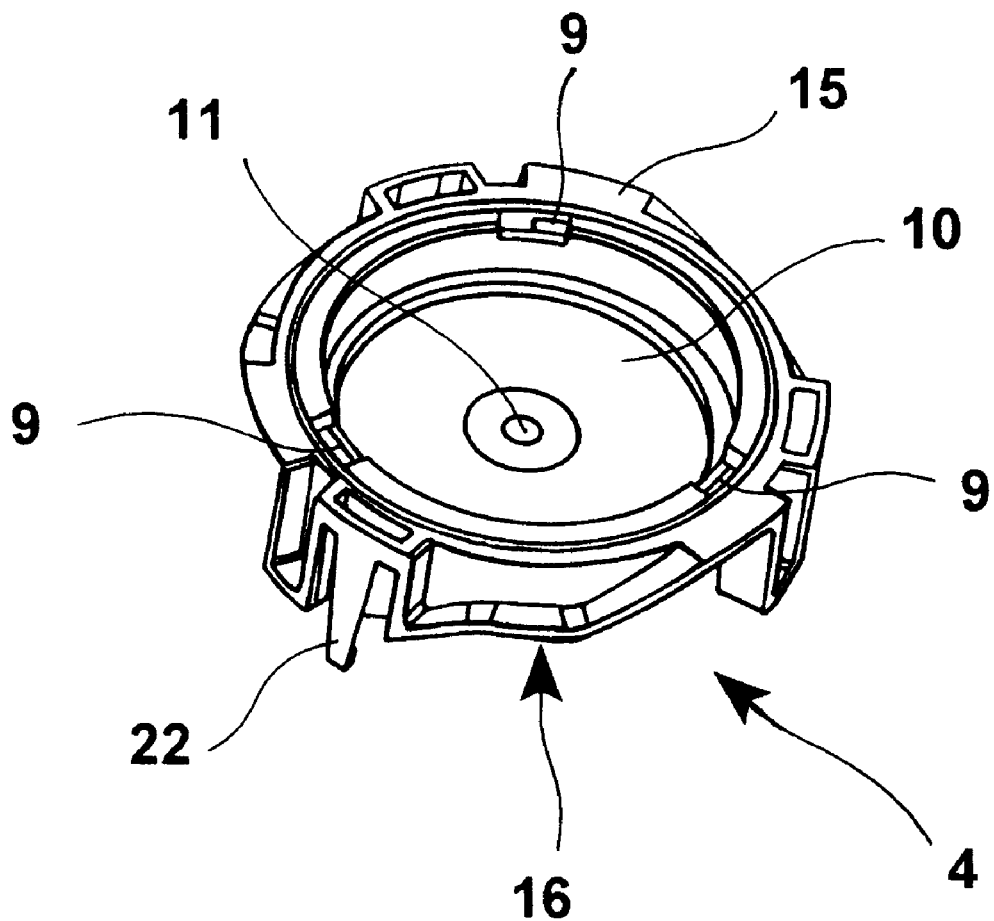
FIG. 4 shows a perspective view of a funnel-shaped filter plate carrier, similar to that of FIG. 1, from above.
Figure 5:
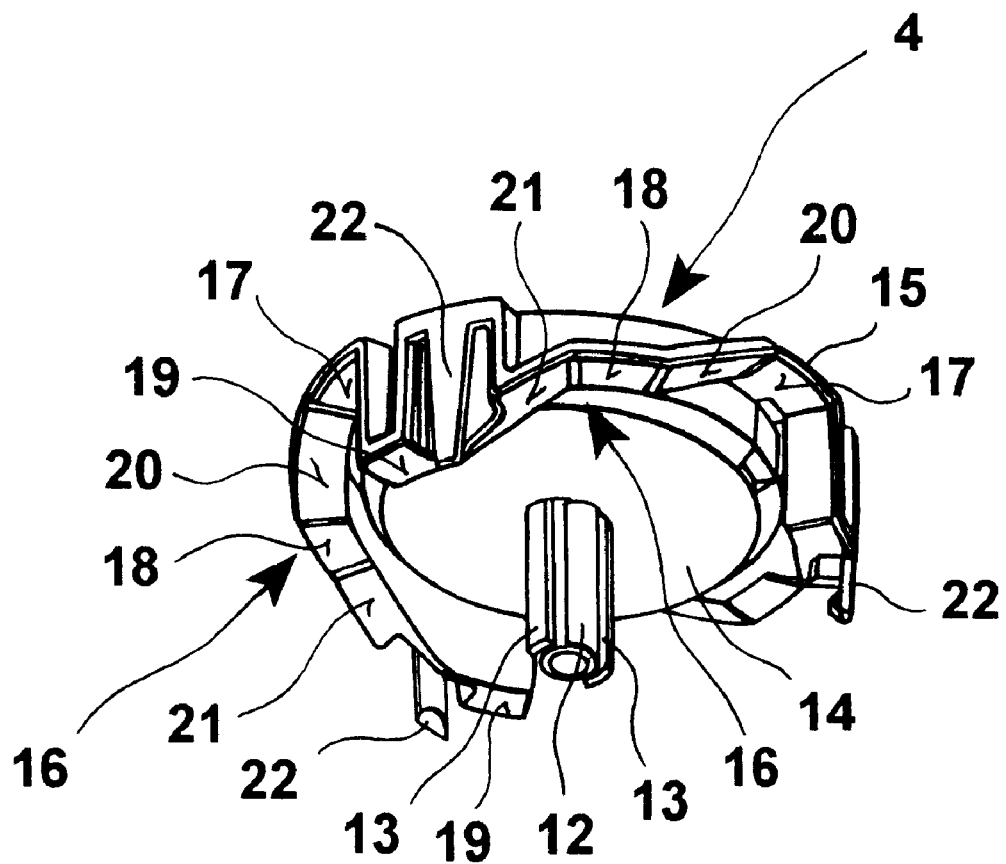
FIG. 5 shows the component according to FIG. 4 in a perspective view from below.
Figure 6:
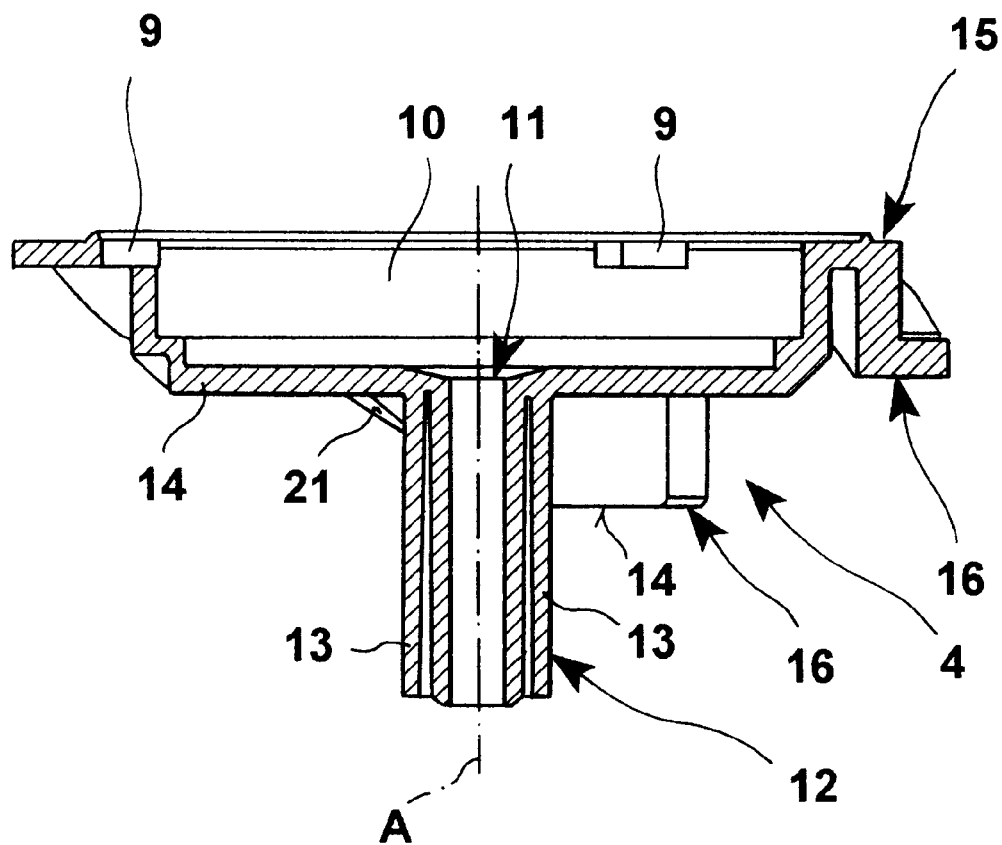
FIG. 6 shows the filter plate carrier of FIG. 4 in an enlarged, fully sectional view.

The frame holder 3 consists of plastic material and has preferably been formed by injection moulding on the rim of the filter plate 1 in an injection-moulding process. The frame holder 3 is attached to the funnel-shaped filter carrier 4 by inserting the locking legs 2 into complementary locking openings 9 and moving them into locking engagement with said filter carrier 4, an annular sealing means 3' being inserted between said frame holder 3 and said filter carrier 4. When the frame holder 3 has been attached, a cylindrical coffee collecting chamber 10 is formed below the filter plate 1, said coffee collecting chamber 10 having only one central discharge opening 11 and being laterally sealed by the sealing means 3' whose sealing effect increases when the filter plate 1 has pressure applied thereto. The discharge opening 11 extends coaxially in a discharge tube 12 projecting from the lower surface of the filter carrier 4. Guide rails 13 extending in the longitudinal direction of the discharge tube 12 are provided on said discharge tube 12 in diametrically opposed relationship with one another; in the assembled condition, said guide rails 13 serve to prevent a rotational displacement of the filter carrier 4. The coffee collecting chamber 10 is surrounded by a kind of cylindrical pot 14 having a radially projecting flange 15 on the upper rim thereof, three projections 16 being arranged on the bottom side of said flange 15 in a substantially uniformly distributed manner. The projections 16 extend at radially uniform distances parallel to the main axis A. The bottom side of said projections 16 has a predetermined contour. This contour comprises three flat step areas 17, 18 and 19 which are arranged at different distances in the axial direction from the flange 15 and which define the filling volume positions in the following. The step areas 17 and 18 are interconnected via a ramp surface 20 and step area 18 and step area 19 are interconnected via a ramp surface 21. As can especially be seen in FIGS. 4 and 5, the projections 16 need not consist of solid material, but the flange 15 can be extended downwards in this area.

In addition, downwardly extending hook elements 22 are provided by means of which the filter carrier 4 is secured against falling out when occupying its uppermost position.

A total of three projections 16 is provided, said projections being arranged on the filter carrier 4 such that one projection is displaced from the next by 120°.

Figure 7:
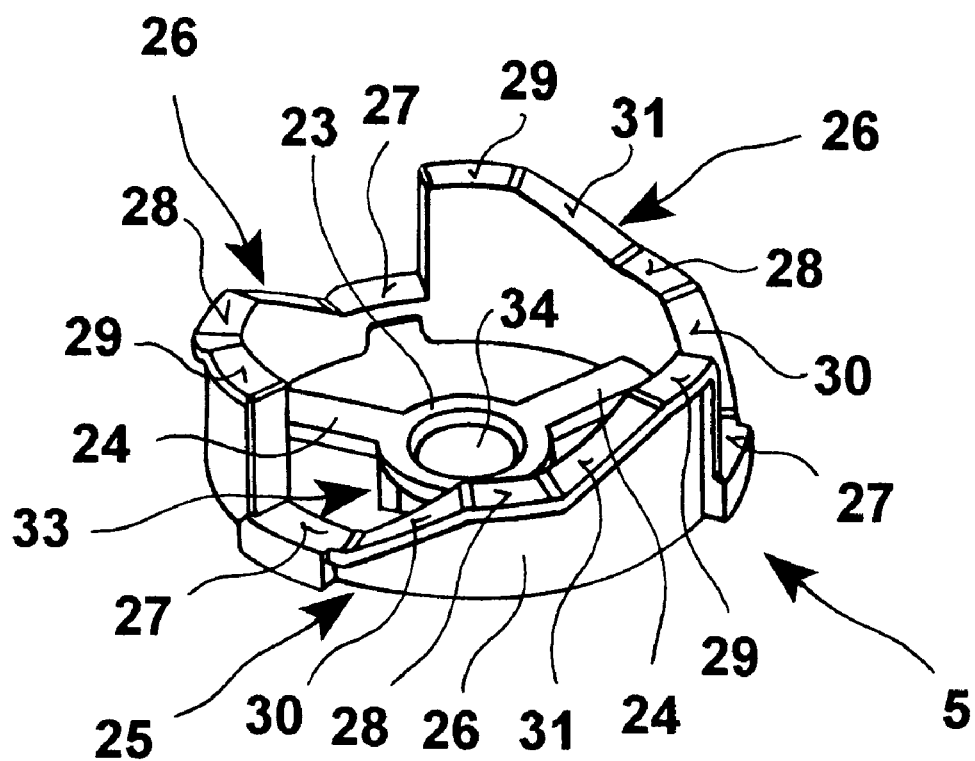
FIG. 7 shows the cam element of FIG. 1 in a perspective view from above.
Figure 8:
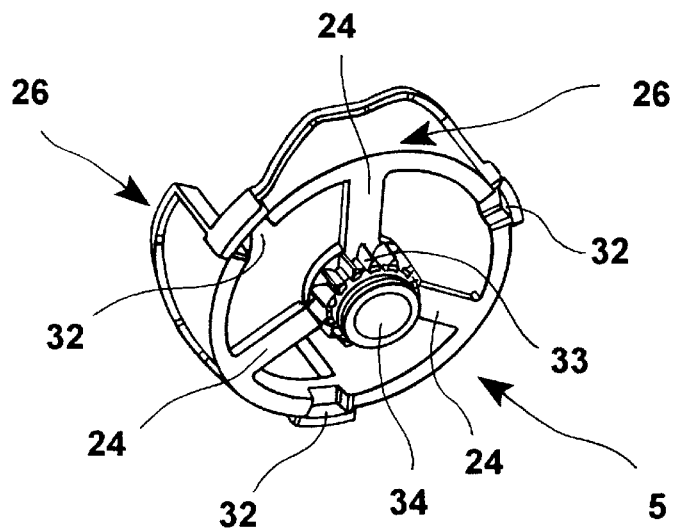
FIG. 8 shows the component of FIG. 7 in a perspective representation from below.
Figure 9:
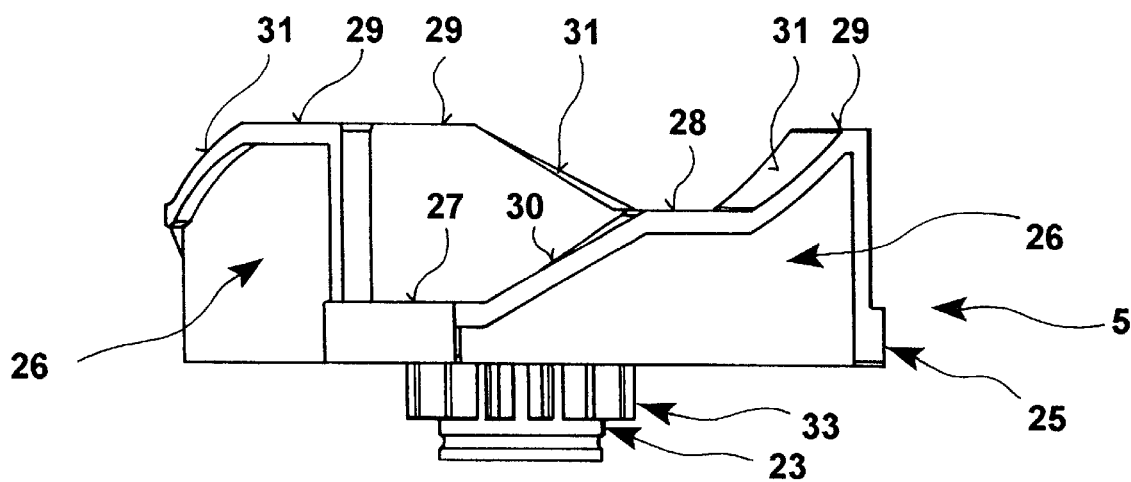
FIG. 9 shows a side view of the cam element of FIG. 7 in an enlarged view.
Figure 10:
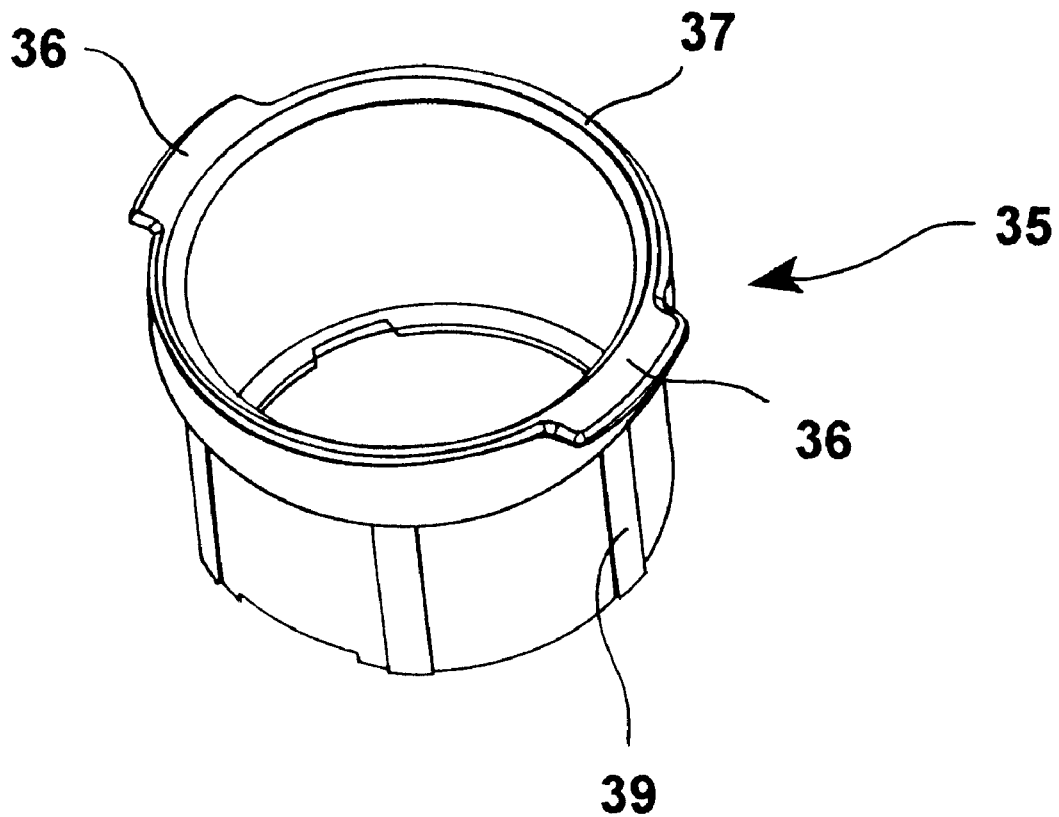
FIG. 10 shows an inner sleeve of the coffee receptacle in a perspective representation from above.

Making reference to FIGS. 7 to 9, the cam element 5 cooperating with the filter carrier 4 will be explained in detail in the following.

The cam element 5 comprises a centric hub 23, three spoke elements 24 projecting radially from said hub 23 at uniform distances. The spoke element 24 has secured thereto a concentric annular control element 25 with three cam projections 26 which are displaced relative to one another at regular intervals. The cam projections 26 extend upwards and are provided with a control contour on their end faces extending transversely to the axis of the cam element 5, said control contour being essentially identical with the control contour of the filter carrier 4. Hence, each cam projection 26 comprises three flat step areas 27, 28 and 29, the step areas 27 and 28 being interconnected via a ramp surface 30 and the step areas 28 and 29 being interconnected via a ramp surface 31. The step areas 27 extend at right angles to the axis of the cam element 5. The axial distance of the step areas 27 and 28 corresponds to the axial distance of the step areas 17 and 18 of the filter carrier 4 and the axial distance of the step areas 28 and 29 corresponds to the distance of the step areas 18 and 19 on the filter carrier 4. This, however, means that the gaps between the cam projections 26 have the same shape as the projections 16 on the filter carrier 4 and that said projections 16 can be accommodated completely in said gaps.

On the bottom side of the control element 25, detent recesses 32 are provided, which are adapted to be engaged by the hook elements 22. The hub 23 is implemented such that it projects beyond the bottom side of the cam element 5, the outer circumference of said hub 23 being provided with a toothed rim 33 with external teeth below the spoke elements 24. The opening 34 of the hub 23 has a diameter guaranteeing that the discharge tube 12 with guide rails 13 can be passed therethrough.

Figure 11:
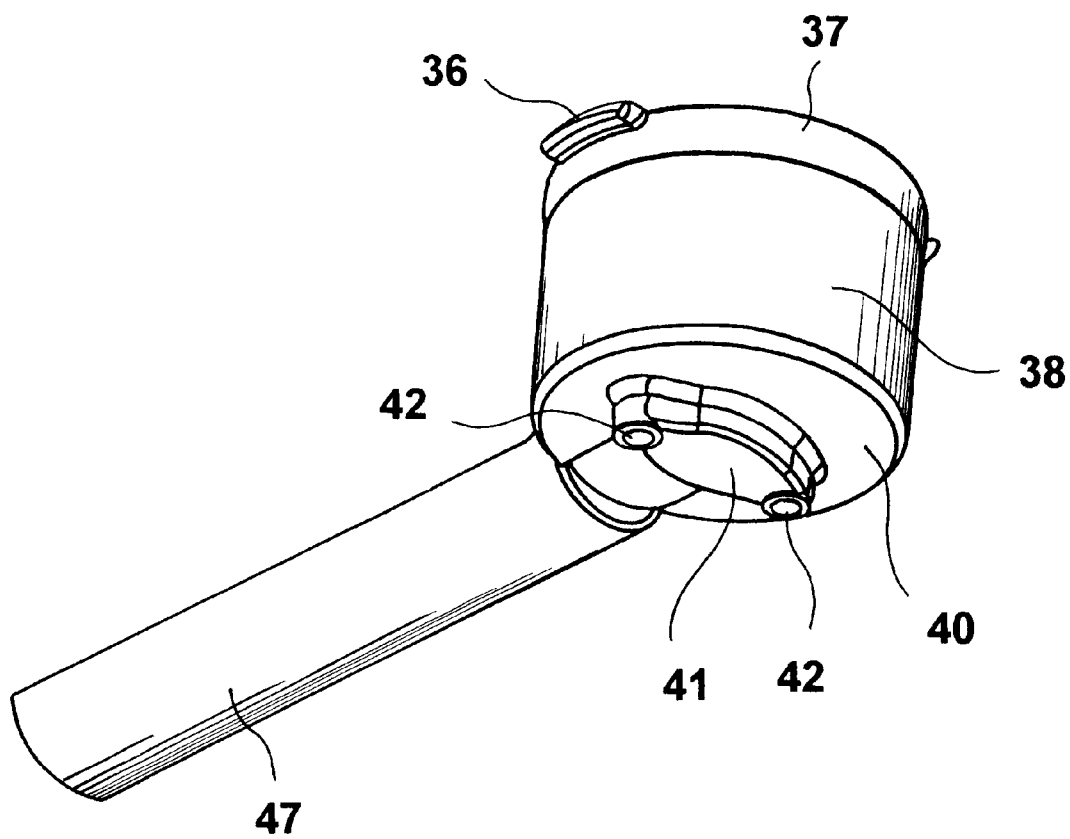
FIG. 11 shows the coffee receptacle with the lower part of the handle in a perspective representation from below.

The whole structure described above is inserted into a coffee receptacle 6. This coffee receptacle 6 comprises an inner sleeve 35 made of metal, preferably by means of aluminium die casting, and having on its upper rim area two diametrically opposed locking flanges 36 defining a bayonet lock together with a complementary reception means of the espresso machine. The upper rim area 37 is thicker than the residual wall of the inner sleeve 35 so that an outer pot 38 (cf. FIG. 11) is flush with said upper rim area 37 when the inner sleeve 35 has been inserted. The inner sleeve 35 is fixedly anchored in the outer pot 38; preferably, the outer pot is anchored on the inner pot by means of injection moulding. The longitudinal strips 39 attached to the outer surface of the inner sleeve 35 act as a means preventing rotational displacement. The inner sleeve 35 is open at the bottom. The way in which the inner sleeve 35 is anchored in the outer pot 38 is clearly shown in FIG. 13. On the basis of this bipartite structural design of the coffee receptacle 6, the otherwise identically constructed espresso brewing head unit can be adapted to espresso machines of various makes with different locking systems by exchanging the inner sleeve 35 with the locking flanges 36.

The outer pot 38 is provided with a bottom wall 40 (cf. FIG. 11) having a downwardly directed protrusion 41 with discharge openings 42. Through this discharge opening 42, the liquid contained in the insert is discharged from the espresso brewing head unit.

Figure 12:
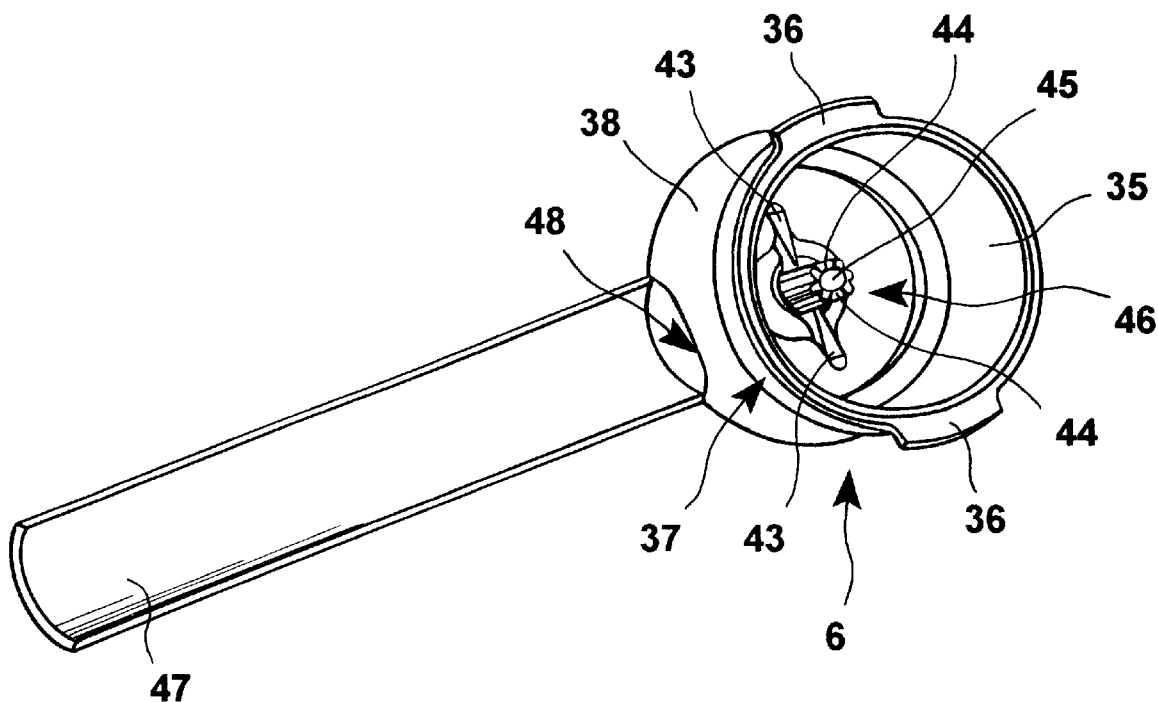
FIG. 12 shows the component of FIG. 11 in a perspective view from above.
Figure 13:
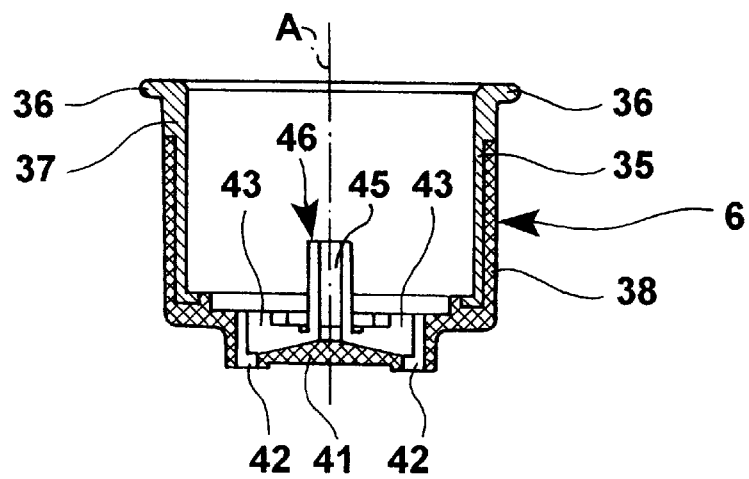
FIG. 13 shows the coffee receptacle of FIG. 11 in a fully sectional view.

In FIGS. 12 and 13, it can be seen that in the interior of the coffee receptacle 6 the protrusion 41 is equipped with trough-shaped passages 43 which end in the discharge opening 42. The passages 43 communicate via slots 44 with the bore 45 of a tubular axle pin 46. The axle pin 46 extends coaxially with the main axis A and has an external diameter which is adapted to be received by the hub 23 in a substantially precisely fitting manner. Hence, the axle pin 46 defines the axis of rotation of the cam element 5. The size of the slots 44 and of the bore 45 of the axle pin 46 are chosen such that the discharge tube 12 and the guide rails 13 on the filter carrier 4 can be inserted into said axle pin 46 in a substantially precisely fitting manner such that they are secured against rotation relative thereto. The guide rails 13 guarantee that the discharge tube 12 can only be moved in the axial direction in said axle pin 46 and that the filter carrier 4 is prevented from rotating about its axis. In addition, the guide rails 13 define together with the slots 44 a kind of labyrinth seal so that the liquid can flow off immediately towards the bottom of the axle pin 46 and into the passages 43.

The outer pot 38 has laterally connected thereto a lower handle shell 47 which is formed integrally with said outer pot 38. The lower handle shell 47 extends radially from the coffee receptacle 6 on the lower end thereof and communicates with the interior of the coffee receptacle 6 via an opening 48 (cf. FIGS. 12 and 1). The lower handle shell 47 is covered by an upper handle shell 49 provided with a bottom wall 50 so that the handle 7 has the shape of a hollow cylinder provided with a bottom wall 50. The handle 7 has arranged therein a rack 51 whose toothed area 52 is in engagement with the toothed rim 33 on the cam element 5. A retaining eye 53 is provided on the rack end which is located opposite the toothed area 52, a pin 54 of a slide member 55 arranged in the upper handle shell 49 being inserted in said retaining eye 53. The slide member 55 can be locked at various positions in the handle 7 so that the rack 51 occupies different, precisely defined positions at which it is inserted in the coffee receptacle 6. The various locking positions of the slide member 55 define the various elevation positions of the filter plate 1, since the cam element 5 is rotated via the toothed rim 33 due to the displacement motion of the rack 51. Further elements used for pretensioning and guiding the rack 51 and defining the locking mechanism of the slide member 55 can be provided.

In the following, the mode of operation of the above described espresso brewing head unit is explained in detail.

The espresso brewing head unit shown is provided with three different elevation positions of the filter plate 1. The first lowermost position of the filter plate 1 defines a filling volume between the filter plate 1 and the wall of the coffee receptacle 6 which is suitable for brewing two espressos. The second, central position of the filter plate 1 corresponds to a filling volume for one espresso portion. The elevated third position corresponds to an ejection position by means of which the used coffee powder is ejected from the coffee receptacle 6.

By displacing the slide member 55, the position of the rack 51 can be changed so as to cause a rotation of the cam element 5 by means of the engagement between the toothed area 52 and the toothed rim 33. At the lowermost position of the filter plate 1 for two espresso portions the cam contour of the filter carrier 4 rests completely on the cam contour of the cam element 5. This means that the step areas 17 and 29, 18 and 28 as well as 19 and 27 of the two elements lie on top of one another other. Hence, the filter carrier 4 and the cam element 5 substantially enclose a hollow cylinder. By displacing the slide member 55 to the next position, the rack 51 is moved, whereby the cam element 5 is rotated. Since the filter carrier 4 cannot rotate due to the guide rails 13, the ramp surfaces will slide on one another and the filter plate 1 will be raised until the second, central position has been reached. At this position, the step areas 19 and 28 as well as 18 and 29 lie on top of one another. The filter carrier 4 has just been raised by the distance between the step areas 27 and 28.

The same will happen when the slide member 55 is actuated once more whereby the rack 51 will be advanced still further so that the cam element will continue its movement in the same direction until it has reached the next position. The ramp surfaces 31 and 21 will again slide on one another until the step areas 29 and 19 lie on top of one another and the uppermost position of the elevating mechanism has been reached. At this position, the filter plate 1 is located in the upper rim area 37 of the coffee receptacle 6 so that while it is pretty well impossible for coffee powder to be taken up, the coffee is ejected after having been used.

It is definitely possible to provide a plurality of intermediate stages, i.e. a plurality of locking positions for the slide member 55. In addition, it is also possible to use an elevating mechanism other than the mechanism that has been described above so as to provide the various positions of the filter plate 1 and the different filling volumes resulting therefrom. Another advantage is that the hot liquid below the filter plate 1 is discharged via the discharge tube 12 directly towards the bottom wall 40 so that a contact between the liquid and the elevating mechanism is avoided as far as possible.

What is claimed is:

1. An espresso brewing head unit comprising a potshaped coffee receptacle in which a displaceable filter plate with coffee discharge openings is provided, a lateral wall of the coffee receptacle and the filter plate defining a filling volume of the coffee receptacle, and elevating means arranged in the coffee receptacle below the filter plate for moving the filter plate relative to the lateral wall of the coffee receptacle for varying said filling volume, said elevating means comprising a projection on a bottom side of the filter plate and at least one movable cam element in contact with the projection, said projection sliding along said cam element in response to movement of said cam element to thereby move said filter plate to various operating positions, wherein the filter plate is arranged on a funnel-shaped filter carrier provided with a central discharge tube which passes through a central opening of the cam element.

2. The espresso brewing head unit of claim 1, wherein the filter plate is moved in predetermined steps in an axial direction of the coffee receptacle.

3. The espresso brewing head unit of claim 1, wherein the cam element rotates about an axis of the coffee receptacle, and has an elevating control contour that is in contact with the projection on the filter plate and is arranged on an axially parallel cam projection, said elevating control countour extending transversely to said axis.

4. The espresso brewing head unit of claim 3, wherein the elevating control contour of the cam projection of the cam element is provided with a plurality of flat step areas arranged at different levels, said step areas defining the operating positions of the filter plate and being interconnected via ramp surfaces.

5. The espresso brewing head unit of claim 1, wherein a tubular extension projects into said coffee receptacle from a bottom thereof, an outer contour of said tubular extension serving as an axle pin for the cam element and an inner contour thereof guiding the discharge tube of the filter carrier such that it is secured against rotation relative to said tubular extension.

6. The espresso brewing head unit of claim 3, including a toothed rim on the cam element, said toothed rim being in engagement with a displaceable rack, whereby displacement of said rack will cause said cam element to rotate.

7. The espresso brewing head unit of claim 6, including a handle arranged on the coffee receptacle with the displaceable rack being located in said handle and a manipulation device on said handle for displacing said rack.

8. The espresso brewing head unit of claim 7, wherein said manipulation device comprises a slide member slidable relative to said handle for displacing the rack transverse to an axis of the toothed rim and being lockable at positions corresponding with the operating positions of the filter plate.

9. An espresso brewing head unit comprising a potshaped coffee receptacle in which a displaceable filter plate with coffee discharge openings is provided, a lateral wall of the coffee receptacle and the filter plate defining a filling volume of the coffee receptacle, and elevating means arranged in the coffee receptacle below the filter plate for moving the filter plate relative to the lateral wall of the coffee receptacle for varying said filling volume, said elevating means comprising a projection on a bottom side of the filter plate and at least one movable cam element in contact with the projection, said projection sliding along said cam element in response to movement of said cam element to thereby move said filter plate to various operating positions, wherein the cam element rotates about an axis of the coffee receptacle, and has an elevating control contour that is in contact with the projection on the filter plate and is arranged on an axially parallel cam projection, said elevating control contour extending transversely to said axis and a toothed rim on the cam element in engagement with a displaceable rack, whereby displacement of said rack causes said cam element to rotate.

10. The espresso brewing head unit of claim 9, wherein the filter plate is moved in predetermined steps in an axial direction of the coffee receptacle.

11. The espresso brewing head unit of claim 9, wherein the elevating control contour of the cam projection of the cam element is provided with a plurality of flat step areas arranged at different levels, said step areas defining the operating positions of the filter plate and being interconnected via ramp surfaces.

12. Espresso brewing head unit of claim 9, wherein the filter plate is arranged on a funnel-shaped filter carrier provided with a central discharge tube which passes through a central opening of the cam element.

13. The espresso brewing head unit of claim 12, wherein a tubular extension projects into said coffee receptacle from a bottom thereof, an outer contour of said tubular extension serving as an axle pin for the cam element and an inner contour thereof guiding the discharge tube of the filter carrier such that it is secured against rotation relative to said tubular extension.

14. The espresso brewing head unit of claim 9, including a handle arranged on the coffee receptacle with the displaceable rack being located in said handle and a manipulation device on said handle for displacing said rack.

15. The espresso brewing head unit of claim 14, wherein said manipulation device comprises a slide member slidable relative to said handle for displacing the rack transverse to an axis of the toothed rim and being lockable at positions corresponding with the operating positions of the filter plate.

* * * * *